(12) United States Patent
Yoshino et al.

(10) Patent No.: US 6,959,725 B2
(45) Date of Patent: Nov. 1, 2005

(54) CONSTANT PRESSURE REGULATOR

(75) Inventors: Kenro Yoshino, Nobeoka (JP);
Toshihiro Hanada, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 0 days.

(21) Appl. No.: 10/380,856

(22) PCT Filed: Jul. 16, 2002

(86) PCT No.: PCT/JP02/07230

§ 371 (c)(1),
(2), (4) Date: Mar. 18, 2003

(87) PCT Pub. No.: WO03/009076

PCT Pub. Date: Jan. 30, 2003

(65) Prior Publication Data
US 2003/0172971 A1 Sep. 18, 2003

(30) Foreign Application Priority Data
Jul. 18, 2001 (JP) .............................. 2001-218456

(51) Int. Cl.[7] .......................... G05D 16/06; F16K 7/17
(52) U.S. Cl. ................................ 137/505.25; 251/61.1
(58) Field of Search .......................... 137/505.25, 505; 251/61.1

(56) References Cited

U.S. PATENT DOCUMENTS

| | | | | |
|---|---|---|---|---|
| 973,609 A | * | 10/1910 | Abrams | ................. 137/505.25 |
| 4,722,360 A | | 2/1988 | Odajima et al. | |
| 4,922,955 A | * | 5/1990 | Uri | .............................. 137/496 |
| 5,676,343 A | * | 10/1997 | Beeson | ........................ 251/61.3 |
| 6,328,277 B1 | * | 12/2001 | Hanada | ........................ 251/61 |

FOREIGN PATENT DOCUMENTS

| | | |
|---|---|---|
| JP | 61-173319 A | 8/1986 |
| JP | 1-70806 A | 3/1989 |
| JP | 4-126324 A | 4/1992 |
| JP | 06-002775 A | 1/1994 |
| JP | 06-002776 A | 1/1994 |
| JP | 6-295209 A | 10/1994 |
| JP | 2000-352468 A | 12/2000 |
| JP | 2001-4045 A | 1/2001 |
| JP | 2001-141083 A | 5/2001 |
| JP | 2001-208237 A | 8/2001 |

\* cited by examiner

Primary Examiner—Stephen M. Hepperle
(74) Attorney, Agent, or Firm—Burns, Doane, Swecker & Mathis LLP

(57) ABSTRACT

In a constant pressure regulator according to the present invention, a diaphragm defining an air chamber with a body is clamped between the body and a cover. An air chamber defining ring provided around the air chamber is clamped between the body and the cover. The upper surface and the lower surface of the air chamber defining ring are formed with a first recess having a seal ring fitted therein for backing the annular protrusion of the diaphragm and a second recess with a seal ring fitted therein for sealing the air chamber, respectively. The diaphragm has a central cylindrical bore portion defining a fluid control potion with the plug formed on the body. A second valve chamber is defined between the diaphragm and the cover. The body is formed with a first valve chamber and an inlet flow passage, and the second valve chamber is formed with an outlet flow passage.

5 Claims, 6 Drawing Sheets

CONSTANT PRESSURE REGULATOR

TECHNICAL FIELD

The present invention relates to a constant pressure regulator which can maintain a constant fluid pressure on a secondary side (downstream side) even if a fluid pressure on the primary side (upstream side) varies, and more particularly to a compact constant pressure regulator which can provide stable fluid pressure control for applications mainly suitable to an ultrapure water line and various chemical liquid lines.

BACKGROUND ART

The present inventors have previously filed an application for a constant pressure regulator that can solve the problems of dust generation due to the contact of parts in a constant pressure regulator and the deterioration of the pressure control performance with a small flow rate, the contents of the application being disclosed in Japanese Unexamined Patent Publication No. 2001-141083.

As shown in FIG. 6, the aforementioned constant pressure regulator includes a body 42 having a first valve chamber 40 and an inlet flow passage 41, a cover member 45 having a second valve chamber 43 and an outlet flow passage 44, a first diaphragm 46 fixed on the upper peripheral edge of the first valve chamber 40, a second diaphragm 47 clamped between the body 42 and the cover member 45, an axially movable sleeve 49 joined to the central portion of the first diaphragm 46 and coupled to an annular coupling portion 50 of the second diaphragm 47, and a plug 52 fixed to the bottom of the first valve chamber 40 and defining a fluid control region 51 between the lower end of the sleeve 49 and the plug 52. The constant pressure regulator has an air chamber 53 surrounded by the inner peripheral surface of the body 42 and the first and second diaphragms 46, 47, and an air supply port 54 communicating with the air chamber 53. The pressure receiving area of the second diaphragm 47 is larger than that of the first diaphragm 46.

In the constant pressure regulator described above, however, the annular protrusion 55 of the second diaphragm 47 can creep and thus the sealing performance of the second valve chamber 43 may be deteriorated with time if the second diaphragm 47 is formed of a material liable to creep such as polytetrafluoroethylene (hereinafter referred to as PTFE) which is suitably used in a line for a corrosive fluid. Also, the use of an elastic material such as rubber often reduces the sealing performance due to the degeneration of the rubber caused by the fluid heat. Further, the structure in which the plug 52 is screwed with the body 42 often reduces the sealing performance of the coupling portion due to the distortion or deformation when a pressure or temperature variation occurs in the first valve chamber 40 for a long time.

DISCLOSURE OF THE INVENTION

The present invention has been conceived in view of the above-mentioned problems of the prior art and the object thereof is to provide a compact constant pressure regulator which can hold the sealing performance of the valve chamber for a long period of time and provide stable fluid pressure for applications suitable to a line for highly corrosive chemical solutions.

In order to achieve the object described above, according to the present invention, there is provided a constant pressure regulator which includes a body; a cover; an air chamber defining ring clamped between the body and the cover; a diaphragm having upper and lower portions connected to the cover and the body, respectively; the body provided with a connecting portion having an upper portion connected to the lower portion of the diaphragm, a first valve chamber having a cylindrical plug protruding from the central portion of the bottom surface of the first valve chamber, an inlet flow passage communicating with the first valve chamber, and a vent hole communicating with an air chamber defined between the diaphragm and the body; the diaphragm provided with a cylindrical bore portion defining a fluid control portion with the plug at the central portion thereof and having an inner diameter smaller than the outer diameter of the plug, a flange portion arranged at the upper portion of the cylindrical bore portion, a first membrane portion radially extending from the flange portion and having an annular protrusion on the peripheral edge thereof, a second membrane portion radially extending from the lower end surface of the cylindrical bore portion, and an annular connecting portion continuously extending from the second membrane portion and connected to the connecting portion of the body; and the cover provided with an annular groove formed on the peripheral edge of the lower end surface thereof and fitted with the annular protrusion of the diaphragm, a second valve chamber located on the inner side of the annular groove for allowing the diaphragm to move up and down, and an outlet flow passage communicating with the second valve chamber; the air chamber defining ring having substantially the same inner diameter as that of the second valve chamber and is clamped between the body and the cover to seal the air chamber; and the air chamber defining ring having an upper surface formed with a first recess fitted with a seal ring for backing the annular protrusion of the diaphragm, and a lower surface formed with a second recess fitted with another seal ring for sealing the air chamber.

According to a preferred embodiment of the present invention, the first recess is an annular groove formed on the upper surface of the air chamber defining ring, and the second recess is an annular groove formed on the lower surface of the air chamber defining ring.

According to another embodiment of the present invention, the connecting portion between the cover and the body is provided with a stepped portion enclosing the air chamber defining ring, the first recess fitted with one of the seal rings is an annular cut-out portion defined between the outer peripheral surface of the air chamber defining ring and the stepped portion, and the second recess fitted with the other seal ring is an annular cut-out portion defined between the outer peripheral surface of the air chamber defining ring and the stepped portion.

According to still another preferred embodiment of the present invention, the material of the diaphragm is PTFE.

Also, according to a preferred embodiment, there are provided at least two vent holes.

Although the material suitably used for the body and the cover is fluorocarbon resin such as PTFE or PFA, the material is not specifically limited to the fluorocarbon resin but may be polyvinyl chloride, polypropylene or other plastics or a metal. Also, although polypropylene is suitably used as a material of a base plate for reinforcing the air chamber defining ring and the body in view of its high strength and heat resistance, the material is not limited to polypropylene but other plastics or a metal may also be used. Further, the material of the diaphragm, for which fluorocarbon resin such as PTFE is suitably used, is not specifically limited but may be rubber or a metal.

BEST MODE FOR CARRYING OUT THE INVENTION

Embodiments of the present invention will be described below with reference to the drawings.

Figure 1:
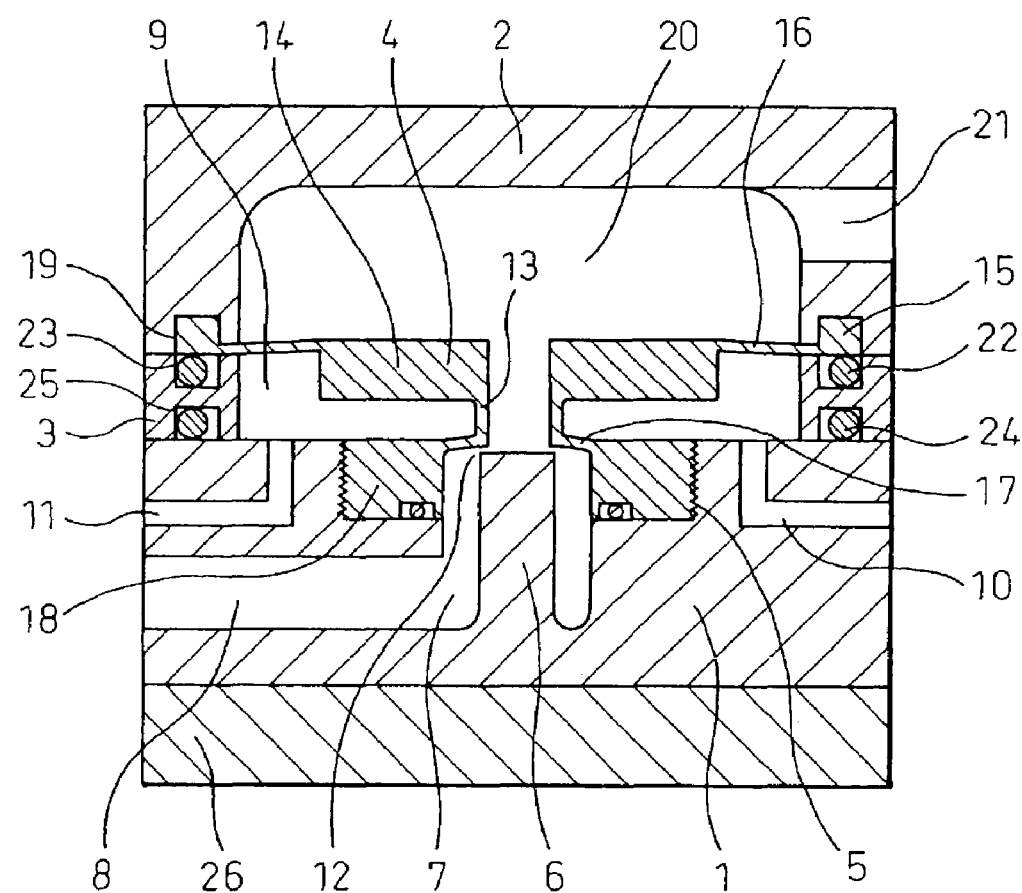
FIG. 1 is a longitudinal sectional view showing an embodiment of a constant pressure regulator according to the present invention.
Figure 2:
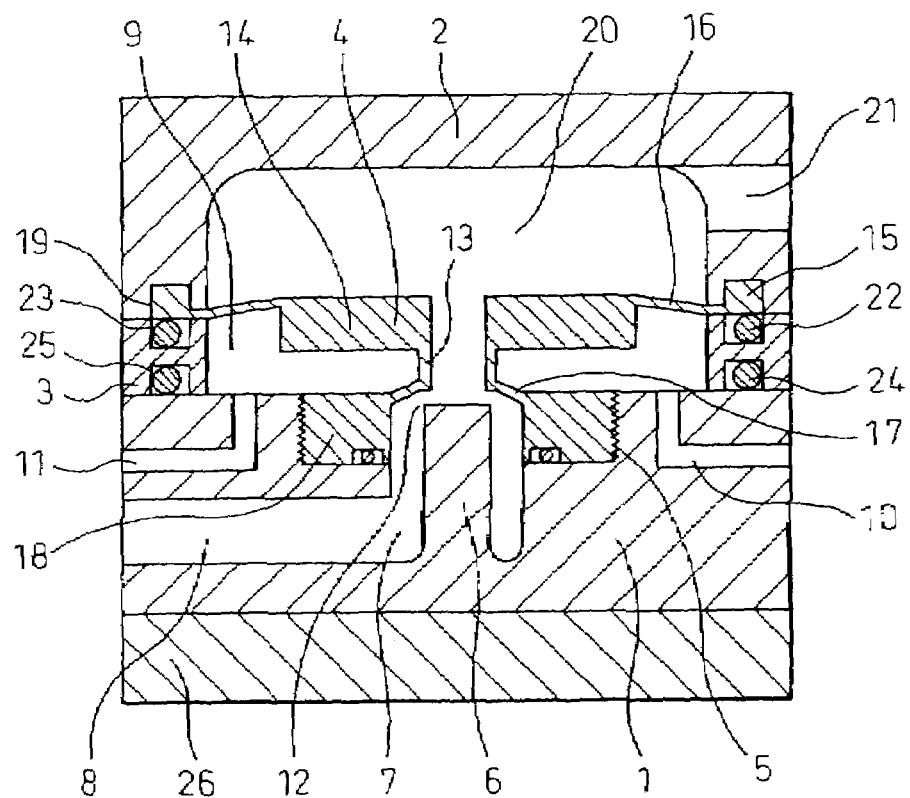
FIG. 2 is a longitudinal sectional view showing the state in which a pressure on the primary side has dropped in FIG. 1.
Figure 3:
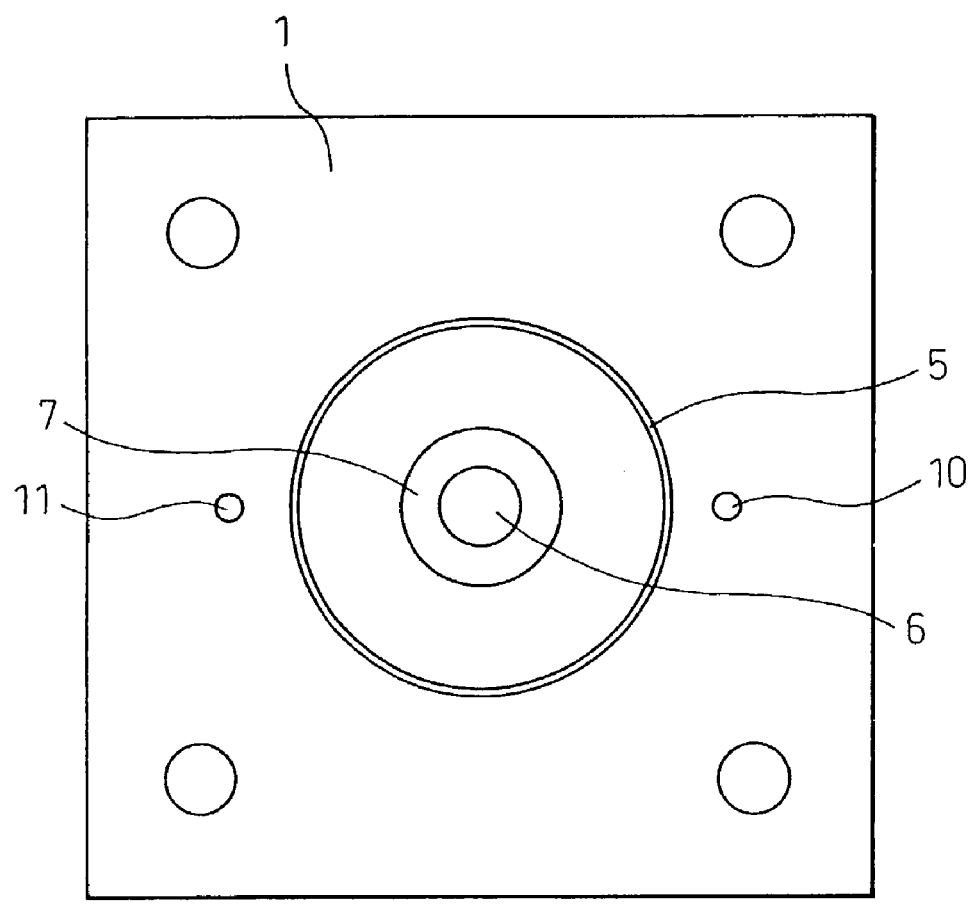
FIG. 3 is a plan view of a body.
Figure 4:
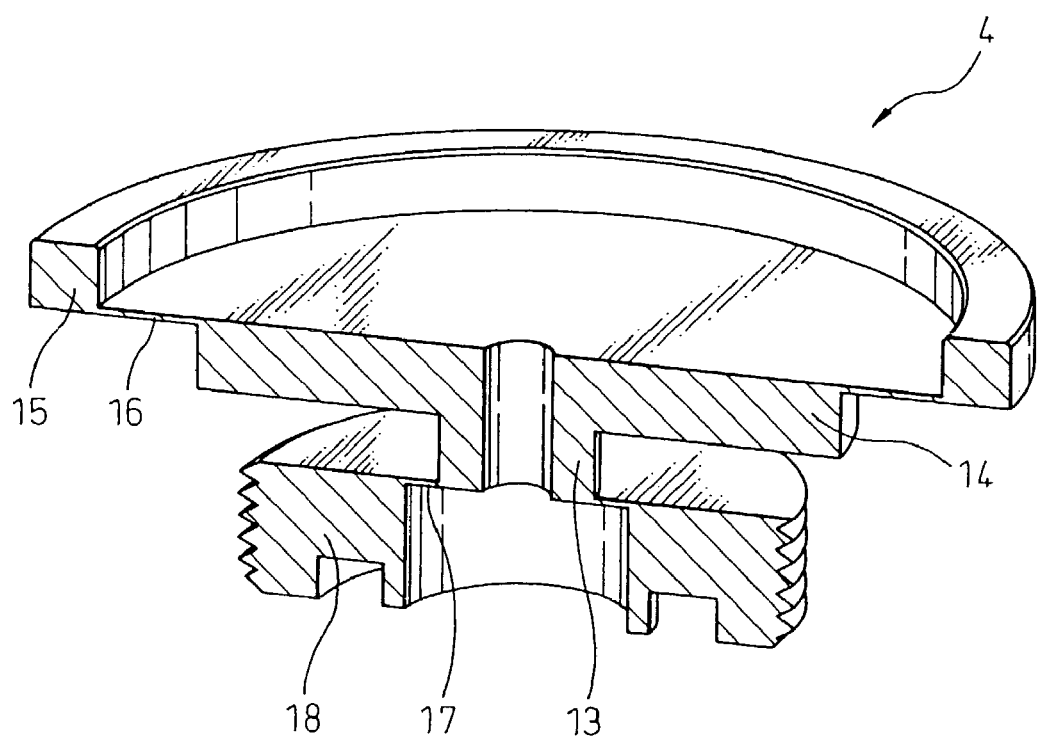
FIG. 4 is a perspective view showing a half of a diaphragm.
Figure 5:
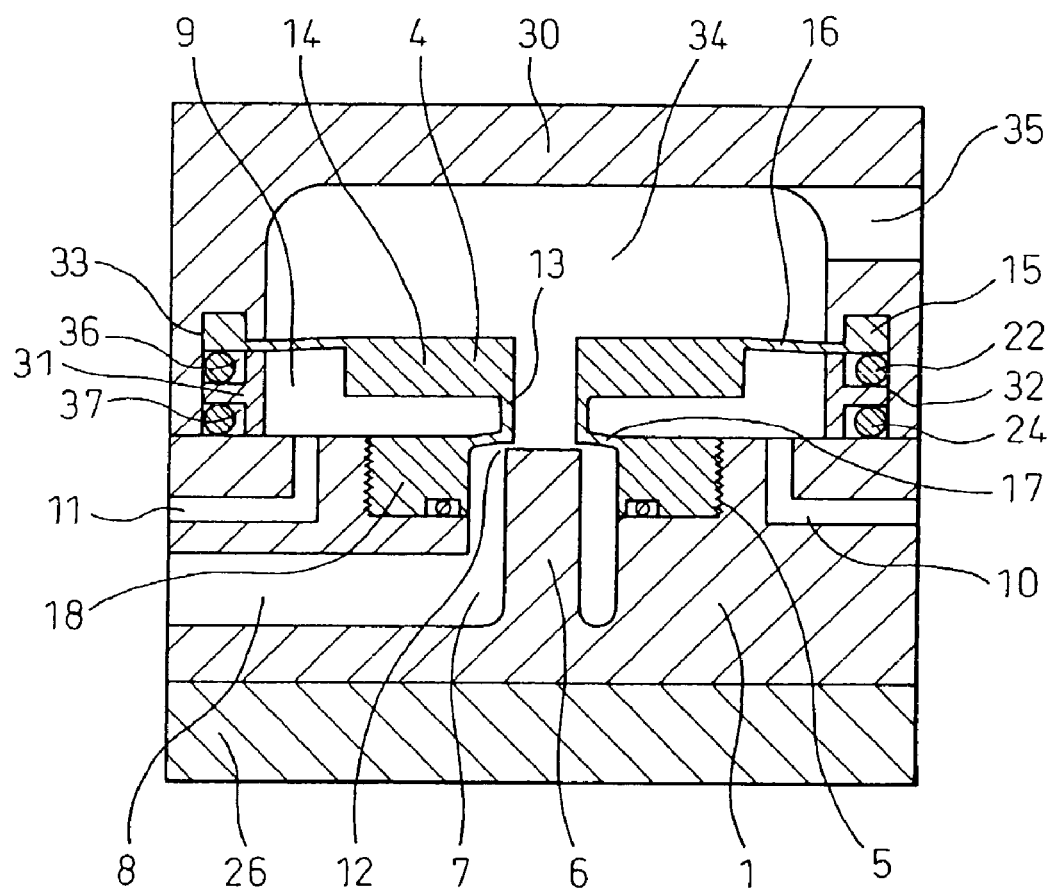
FIG. 5 is a longitudinal sectional view showing another embodiment of a constant pressure regulator according to the present invention.
Figure 6:
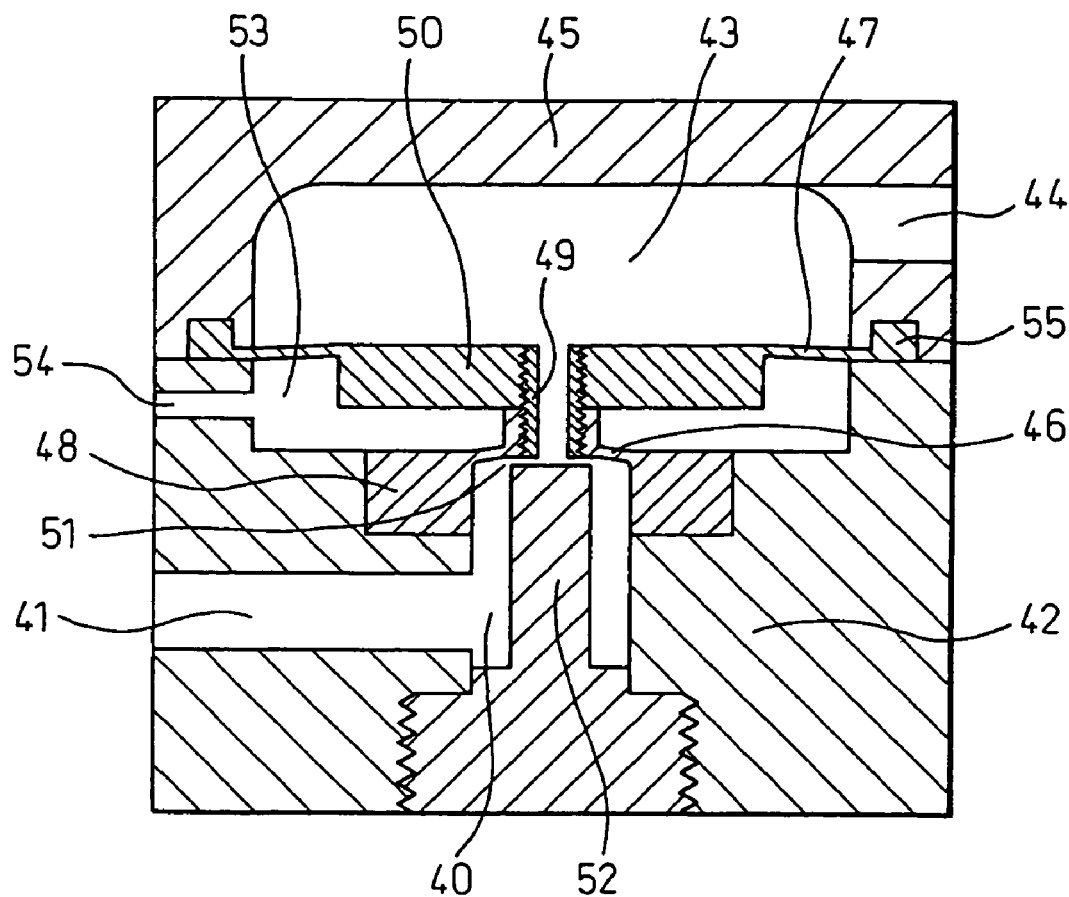
FIG. 6 is a longitudinal sectional view of a constant pressure regulator in the prior art.

FIG. 1 is a longitudinal sectional view showing a constant pressure regulator according to the present invention. FIG. 2 is a longitudinal sectional view showing the state in which a pressure on the primary side has dropped in the constant pressure regulator according to the present invention. FIG. 3 is a plan view of the body in FIG. 1. FIG. 4 is a perspective view of a half of the diaphragm in FIG. 1. FIG. 5 is a longitudinal sectional view showing another embodiment of a constant pressure regulator according to the present invention.

In the drawings, reference numeral 1 designates a body made of PTFE having a first valve chamber 7 therein. An inlet flow passage 8 communicating with a valve chamber 7 and vent holes 10, 11 communicating with an air chamber 9 are formed on the side surface of the body 1. A connecting portion 5 to which an annular connecting portion 18 located on the lower portion of the diaphragm 4 is connected is provided on the upper portion of the first valve chamber 7. A cylindrical plug 6 protrudes from the central portion of the bottom surface. Although the vent holes 10, 11 are used for sucking and exhausting air, only a single vent hole is sufficient to meet the requirements and thus the number of the vent holes should not be specifically limited. A plan shape of the body 1 is shown in FIG. 3.

Reference numeral 2 designates a cover made of PTFE, which is provided at the peripheral edge of the lower end thereof with an annular groove 19 fitted with an annular protrusion 15 of the diaphragm 4, a second valve chamber 20 having a circular cross section and located on the inner side of the groove 19 for allowing the diaphragm 4 to move up and down, and an outlet flow passage 21 on the side surface thereof communicating with the second valve chamber 20.

Reference numeral 3 designates a ring for defining an air chamber, which is made of polypropylene and has substantially the same inner diameter as that of the second valve chamber 20. An annular groove 23 fitted with a seal ring 22 made of an elastic rubber material for backing the annular protrusion 15 of the diaphragm 4 is formed on the upper surface of the air chamber defining ring 3, while another annular groove 25 fitted with another seal ring 24 for sealing the air chamber 9 is formed on the lower surface of the air chamber defining ring 3. This air chamber defining ring 3 is clamped between the body 1 and the cover 2.

The diaphragm 4 is made of PTFE and includes a cylindrical bore portion 13 having an inner diameter smaller than the outer diameter of the plug 6 at the central portion thereof, a flange portion 14 arranged at the upper portion of the cylindrical bore portion 13, a first membrane portion 16 radially extending from the flange portion 14 and having an annular protrusion 15 on the peripheral edge thereof, a second membrane portion 17 radially extending from the lower end of the cylindrical bore portion 13, and an annular connecting portion 18 continuously extending from the second membrane portion 17 and screwed via an O-ring to the connecting portion 5 of the body 1. A fluid control portion 12 is defined between the lower end of the cylindrical bore portion 13 and the upper surface of the plug 6 formed at the central portion of the first valve chamber 7. The method of connecting the annular connecting portion 18 to the connecting portion 5 of the body 1 is not limited to screwing but may employ another connecting means. The annular protrusion 15 of the diaphragm 4 is fitted into the annular groove 19 of the cover 2 while at the same time being pressed against the annular groove 19 by the seal ring 22 backing the annular protrusion 15. Further, the pressure receiving area of the upper surface of the diaphragm 4 should be larger than the pressure receiving area of the lower surface, i.e. the pressure receiving area of the second membrane portion 17.

The air chamber 9 is defined such that it is surrounded by the diaphragm 4 and the air chamber defining ring 3. A compressed air or an inertial gas regulated in pressure by using a gas regulator or the like is introduced into the interior of the air chamber 9 from the vent hole 10 and the pressure in the air chamber is adjusted to maintain a constant pressure while discharging a slight amount of the compressed air or the inertial gas from the vent hole 11. If the pressure of the air or gas is changed, the fluid pressure on the primary side of the constant pressure regulator is maintained at a pressure corresponding to the changed pressure of the air or gas. By regulating the pressure of the air or gas, therefore, the pressure on the secondary side of the regulator can be adjusted to the desire value.

Reference numeral 26 designates a reinforcing base plate made of polypropylene, which is fixedly clamped with the cover 2, the air chamber defining ring 3 and the body 1 by bolts and nuts (not shown). For example, in the case where the constant pressure regulator is made of a material which has low strength and is liable to cause a creep such as PTFE or polyethylene, it is preferred to reinforce the body by the base plate 26 to prevent the deformation and the loosening of the bolts and nuts in order to prevent the body from deforming when it is clamped by bolts and nuts or to prevent the bolts and nuts from loosening with time. The base plate 26 is not necessarily required in the case where the constant pressure regulator is made of a sufficiently tough material.

The operation of the constant pressure regulator of this embodiment configured as above is as follows.

In the state shown in FIG. 1, the second membrane portion 17 is subjected to an upward force due to the internal pressure in the first valve chamber 7, i.e. the pressure on the upstream side (primary side) of the constant pressure regulator and to a downward force due to the internal pressure in the air chamber 9. On the other hand, the upper surface of the diaphragm 4 is subjected to a downward force due to the internal pressure in the second valve chamber 20, i.e. the pressure on the downstream side (secondary side) of the regulator. Also, the first membrane portion 16 and the flange portion 14 corresponding to the upper surface of the diaphragm 4 are subjected to an upward force due to the internal pressure in the air chamber 9. Thus, the degree of balance maintained among these four forces determines the position of the cylindrical bore portion 13 formed integrally with the diaphragm 4.

In the case where the pressure on the primary side is lowered in the state shown in FIG. 1, both the pressure and the flow rate on the secondary side are also temporarily lowered. As a result, the pressure in the second valve chamber 20 drops and so does the force applied to the upper surface of the diaphragm 4. However, as the membrane portion pressure in the air chamber 9 applied to the first membrane portion 16 and the flange portion 14 is constant, the internal pressure in the air chamber 9 applied to the first membrane portion 16 and the flange portion 14 increases so that it tends to draw the cylindrical bore portion 13 upward. Also, although the pressure in the first valve chamber 7 is lowered and the force applied to the second membrane portion 17 by the fluid is lowered, the pressure in the air chamber 9 is constant, so that the second membrane portion 17 tends to draw the cylindrical bore portion 13 downward. In the process, in view of the fact that the area of the first membrane portion 16 and the flange portion 14 is sufficiently larger than the area of the second membrane portion 17, the cylindrical bore portion 13 is drawn downward (the state in FIG. 2). Therefore, the opening area of the fluid control portion 12 increases and the fluid pressure on the secondary side instantaneously increases up to the original level, thereby maintaining the balance between the internal pressure in the air chamber 9 and the force due to the fluid pressure again. Usually, a fixed throttle or valve, not shown, is installed downstream of the constant pressure regulator according to the present invention. As long as the downstream side portion of the fixed throttle or the valve is opened to the atmosphere, the differential pressure between the front and rear sides of the fixed throttle or the valve will be always maintained constant, so that a flow rate corresponding to the flow rate coefficient of the fixed throttle or the valve can be always maintained.

On the other hand, in the case where the pressure on the primary side increases in the state of FIG. 2, the pressure and flow rate on the secondary side also increase temporarily. Thus, the pressure in the second valve chamber 20 rises to try to push down the cylindrical bore portion 13. Also, the pressure in the first valve chamber 7 increases and therefore the second membrane portion 17 tries to push up the cylindrical bore portion 13. Similarly, as the area of the upper surface of the diaphragm 4 is sufficiently larger than that of the second membrane portion 17, the cylindrical bore portion 13 will be pushed down. Therefore, the opening area of the fluid control portion 12 decreases (the state of FIG. 1), and the fluid pressure on the secondary side instantaneously drops to the original level. Thus, the balance of force between the internal pressure in the air chamber 9 and the fluid pressure is maintained, thereby maintaining the original flow rate.

As described above, even if the pressure on the primary side increases or decreases, the position of the cylindrical bore portion 13 of the diaphragm 4 instantaneously changes so that the pressure on the secondary side is always maintained at a constant level and therefore the set flow rate can be stably maintained.

Further, when the internal pressure in the air chamber 9 is changed, the pressure on the secondary side is maintained to a value corresponding to the changed pressure. Therefore, the set flow rate can be changed if the fixed throttle or the valve installed downstream is not changed.

Also, the fluid which has reached the second valve chamber 20 tends to flow out of the constant pressure regulator through the seal surfaces of the annular groove 19 and the annular protrusion 15 of the diaphragm 4 under the effect of the pressure of the fluid. However, as the annular protrusion 15 is pressed into the annular groove 19 of the cover 2 by the seal ring 22 fitted into the annular groove 23 arranged on the upper surface of the air chamber defining ring, the fluid is prevented from flowing out of the constant pressure regulator.

However, when variations of the pressure and the temperature of the fluid over a long period of time causes a creep or a distortion of the annular protrusion 15 of the diaphragm 4 and the annular groove 19 of the cover 2, or when the frequent changing of the fluid temperature loosens the bolts clamping the body 1, the cover 2, the air chamber defining ring 3 and the base plate 26, the force pressing the annular protrusion 15 of the diaphragm 4 into the annular groove 19 of the cover 2 tends to decrease.

However, in the constant pressure regulator according to the present invention, as the annular protrusion 15 is pressed into the annular groove 19 of the cover 2 by the elasticity of the seal ring 22, the force pressing the annular protrusion 15 into the annular groove 19 does not decrease, so that the fluid is prevented from flowing out of the constant pressure regulator.

Further, even if the seal ring 22 is degraded under the influence of the fluid temperature, the fluid is prevented from flowing out of the constant pressure regulator due to the fact that the annular protrusion 15 of the diaphragm 4 is pressed into the annular groove 19 of the cover 2 by the elasticity of the seal ring 24 fitted into the annular groove 25 on the lower portion of the air chamber defining ring 3 to which the fluid temperature is not easily transmitted.

FIG. 5 is a longitudinal sectional view showing another embodiment of the present invention.

In the drawing, the body 1, the diaphragm 4, the seal rings 22, 24 and the base plate 26 are identical to those of the first embodiment and are therefore designated by the same reference numerals as the corresponding component parts, respectively, in the first embodiment.

Only the difference from FIG. 1 will be explained below.

Reference numeral 30 designates a cover provided with a stepped portion 32 enclosing an air chamber defining ring 31 and the seal rings 22, 24 at the lower inner surface thereof, an annular groove 33 arranged on the step surface of the stepped portion 32 and fitted with an annular protrusion 15 of the diaphragm 4, a second valve chamber 34 of a circular cross section located on the inner side of the annular groove 33 and allowing the diaphragm 4 to move up and down, and an outlet flow passage 35 located on the side surface of the cover and communicating with the second valve chamber 34.

Reference numeral 31 designates an air chamber defining ring clamped between the body 1 and the cover 30. The air chamber defining ring 31, which has substantially the same inner diameter as that of the second valve chamber 34, is provided with an annular cut-out portion 36 fitted with the seal ring 22 on the outer periphery of the upper surface thereof, and with an annular cut-out portion 37 fitted with the seal ring 24 on the outer periphery of the lower surface thereof. The annular cut-out portion 36 is designed to press the seal ring 22 against the inner peripheral surface of the stepped portion 32 and the annular protrusion 15. Further, the annular cut-out portion 37 is designed to press the seal ring 24 against the inner peripheral surface of the stepped portion 32 and the upper end surface of the body 1, and the seal rings 22, 24 are used for backing the annular protrusion 15 of the diaphragm 4 as well as for sealing the air chamber 9.

The operation of the constant pressure regulator of the second embodiment having the construction as described above is the same as that of the first embodiment, and will be omitted. It should be noted that even if the fluid of the second valve chamber 34 may flow out of the seal surface between the annular groove 33 of the cover 30 and the annular protrusion 15 of the diaphragm 4, the fluid is prevented from flowing out of the regulator because the seal ring 22 is arranged to press the inner peripheral surface of the stepped portion 32 of the cover 30 and the annular protrusion 15 of the diaphragm 4 against each other.

The constant pressure regulator according to the present invention has the construction described above and can achieve the following superior effects in practical applications using it:

(1) As the sealing portions of the valve chambers are backed by the seal rings and further backed at the location where temperature is not easily transmitted, a reliable sealing performance is maintained for a long period of time.

(2) As the plug of the first valve chamber is formed integrally with the body, the possibility of fluid leaking out from the first valve chamber is completely eliminated as compared with the conventional constant pressure regulator.

(3) The construction is compact and stable control of the fluid pressure can be achieved.

(4) Since all of the members in contact with the fluid can be made of a material having a high chemical resistance such as PTFE or the like, the elution of impurities and contamination with chemical solutions seldom occur.

What is claimed is:

1. A constant pressure regulator comprising a body, a cover; an air chamber defining ring clamped between said body and said cover; a diaphragm having the upper and lower portions connected to said cover and said body, respectively; said body provided with a connecting portion having an upper portion connected to said lower portion of said diaphragm, a first valve chamber having a cylindrical plug protruding from the central portion of the bottom surface thereof, an inlet flow passage communicating with said first valve chamber, and a vent hole communicating with an air chamber defined between said diaphragm and said body so that the pressure in said air chamber is adjustable through said vent hole; said diaphragm provided with a cylindrical bore portion defining a fluid control portion with said plug at the central portion thereof and having an inner diameter smaller than the outer diameter of said plug, a flange portion arranged at the upper portion of said cylindrical bore portion, a first membrane portion radially extending from said flange portion and having an annular protrusion on the peripheral edge thereof, a second membrane portion radially extending from the lower end surface of said cylindrical bore portion, and an annular connecting portion continuously extending from said second membrane portion and connected to said connecting portion of said body; said cover provided with an annular groove formed on the peripheral edge of the lower end surface thereof and fitted with said annular protrusion of said diaphragm, a second valve chamber located on the inner side of said annular groove for allowing said diaphragm to move up and down, and an outlet flow passage communicating with said second valve chamber; said air chamber defining ring has substantially the same inner diameter as that of said second valve chamber and is clamped between said body and said cover to seal said air chamber; and said air chamber defining ring having an upper surface formed with a first recess fitted with a first seal ring for backing said annular protrusion of said diaphragm, and a lower surface formed with a second recess fitted with a second seal ring for sealing said air chamber.

2. The constant pressure regulator according to claim 1, wherein said first recess fitted with said first seal ring comprises an annular groove formed on the upper surface of said air chamber defining ring, and said second recess fitted with said second seal ring comprises an annular groove formed on the lower surface of said air chamber defining ring.

3. The constant pressure regulator according to claim 1, wherein a portion of said cover connecting to said body is provided with a stepped portion enclosing said air chamber defining ring; and wherein said first recess fitted with said first seal ring comprises an annular cut-out portion defined between the outer peripheral surface of said air chamber defining ring and said stepped portion, and said second recess fitted with said second seal ring comprises an annular cut-out portion defined between the outer peripheral surface of said air chamber defining ring and said stepped portion.

4. The constant pressure regulator according to claim 1, wherein the material of said diaphragm is polytetrafluoroethylene.

5. The constant pressure regulator according to claim 1, comprising at least two vent holes.

* * * * *